United States Patent
Saraf et al.

(10) Patent No.: US 12,547,166 B2
(45) Date of Patent: Feb. 10, 2026

(54) METHOD AND SYSTEM FOR TELEOPERATIONS AND SUPPORT SERVICES

(71) Applicant: Verizon Patent and Licensing Inc., Basking Ridge, NJ (US)

(72) Inventors: Rohit Shirish Saraf, Nashua, NH (US); Bhumip Khasnabish, Lexington, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 201 days.

(21) Appl. No.: 16/999,187

(22) Filed: Aug. 21, 2020

(65) Prior Publication Data

US 2022/0057791 A1    Feb. 24, 2022

(51) Int. Cl.
| | |
|---|---|
| G05D 1/00 | (2024.01) |
| G05B 13/02 | (2006.01) |
| H04W 24/04 | (2009.01) |
| H04W 36/14 | (2009.01) |
| H04W 76/12 | (2018.01) |

(52) U.S. Cl.
CPC ....... *G05D 1/0011* (2013.01); *G05B 13/0265* (2013.01); *H04W 24/04* (2013.01); *H04W 76/12* (2018.02); *H04W 36/142* (2023.05)

(58) Field of Classification Search
None
See application file for complete search history.

(56) References Cited

U.S. PATENT DOCUMENTS

| | | | |
|---|---|---|---|
| 2008/0017436 A1* | 1/2008 | Dower | B62D 7/1509 180/402 |
| 2017/0300065 A1* | 10/2017 | Douglas | B64C 29/0025 |
| 2018/0139152 A1* | 5/2018 | Shaw | H04W 84/18 |
| 2019/0044835 A1* | 2/2019 | Kutch | H04L 47/2441 |
| 2019/0075501 A1* | 3/2019 | Chen | H04W 76/15 |
| 2019/0118792 A1* | 4/2019 | Malone | B60W 10/20 |
| 2019/0227843 A1* | 7/2019 | Custodio | G06F 9/4843 |
| 2020/0008044 A1* | 1/2020 | Poornachandran | H04L 41/5019 |
| 2020/0012275 A1* | 1/2020 | Hanscom | G05D 1/0038 |
| 2020/0026273 A1* | 1/2020 | He | B64U 50/10 |
| 2020/0036742 A1* | 1/2020 | Casella | G06F 21/577 |
| 2020/0236602 A1* | 7/2020 | Mahkonen | H04W 76/25 |
| 2021/0065566 A1* | 3/2021 | Li | H04W 4/023 |
| 2021/0176925 A1* | 6/2021 | DeFelice | G05D 1/689 |
| 2021/0235355 A1* | 7/2021 | Seo | H04W 36/322 |
| 2023/0026671 A1* | 1/2023 | Seed | H04W 36/322 |

FOREIGN PATENT DOCUMENTS

| | | | | |
|---|---|---|---|---|
| KR | 20170074539 A | * | 6/2017 | ........... G05D 1/0808 |
| WO | WO-2022027337 A1 | * | 2/2022 | ........... G05D 1/0808 |

* cited by examiner

*Primary Examiner* — Joseph E Avellino
*Assistant Examiner* — Anindita Sen

(57) ABSTRACT

A method, a device, and a non-transitory storage medium are described in which an edge computing-based teleoperations service is provided. An edge network device may select an active and one or multiple backup remote-controlling devices in support of a teleoperations service session. The edge network device may include artificial intelligence to learn remote-controlling functions based on communications relayed between a remote-controlled device and the active remote-controlling device. The edge network device may use the learned remote-controlling functions during a failover procedure or other triggering network event.

20 Claims, 14 Drawing Sheets

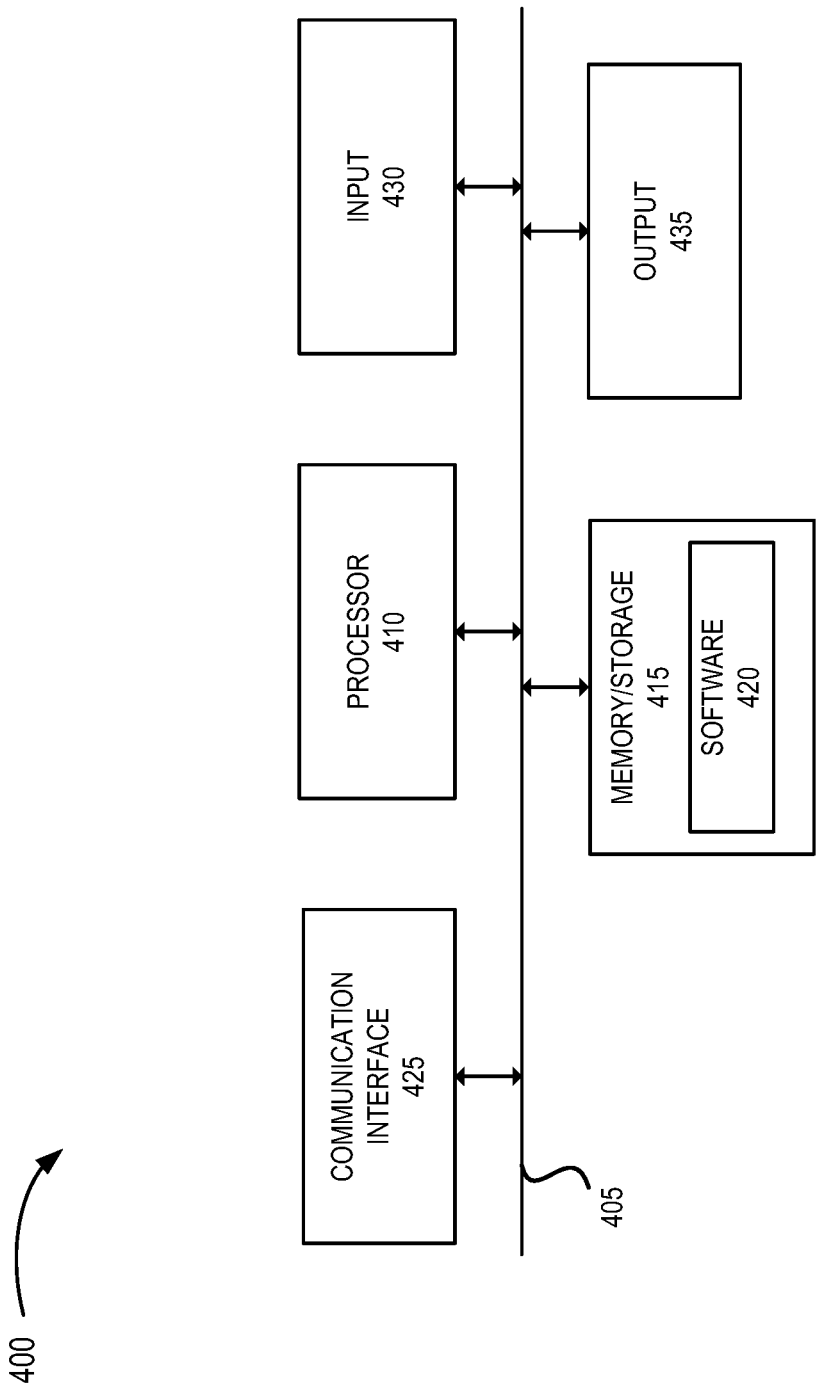

METHOD AND SYSTEM FOR TELEOPERATIONS AND SUPPORT SERVICES

BACKGROUND

Teleoperations may encompass any remote operation of an asset. For example, teleoperations may be applied to various applications, such as fully or partially autonomous vehicles, robotics, and other related applications or fields of use. Teleoperations technologies may allow for real-time or near real-time operations to be performed without having a human directly in the environment.

BRIEF DESCRIPTION OF THE DRAWINGS

FIG. 4 is a diagram illustrating exemplary components of a device that may correspond to one or more of the devices illustrated and described herein;

DETAILED DESCRIPTION OF PREFERRED EMBODIMENTS

Figure 1:
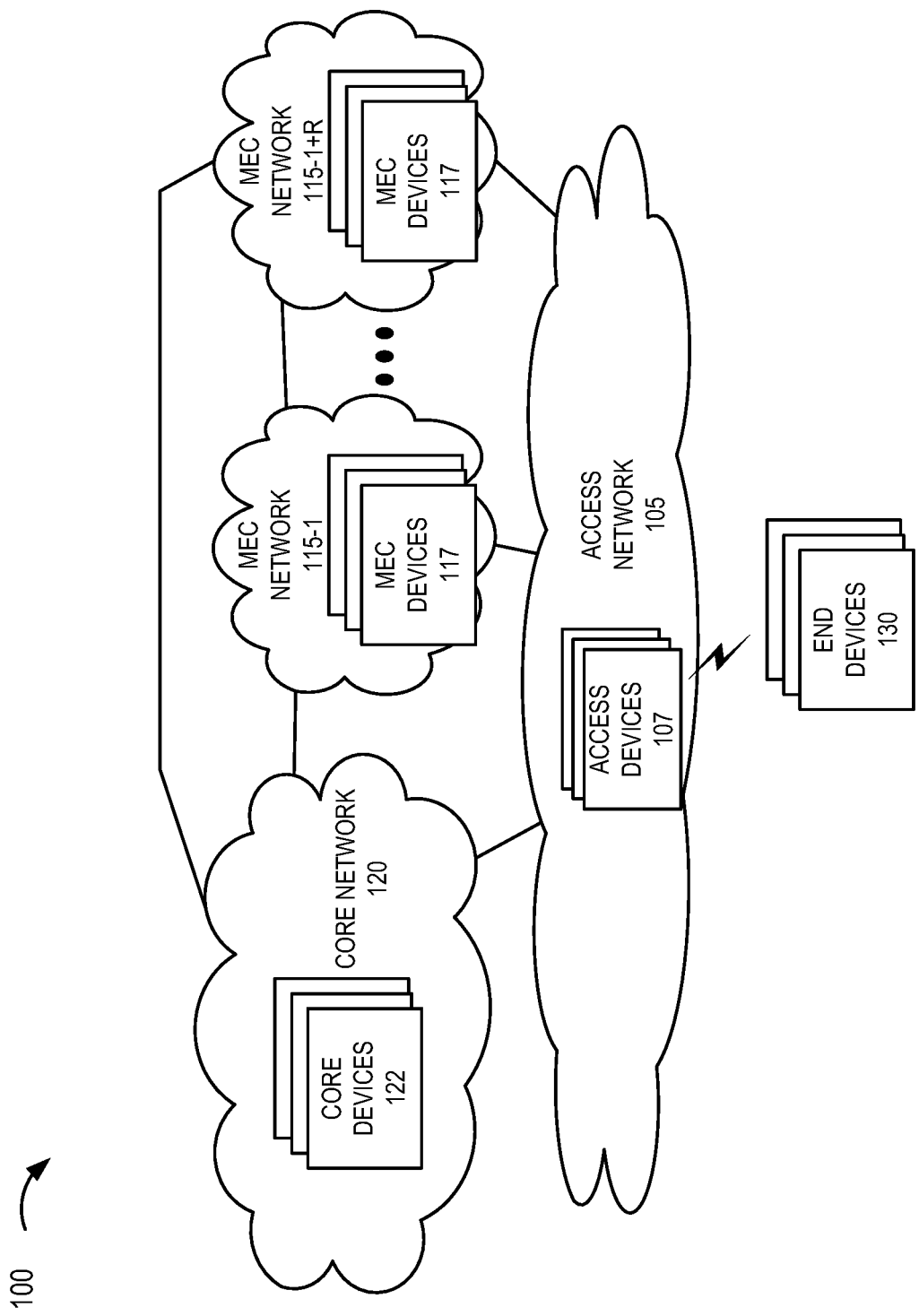
FIG. 1 is a diagram illustrating an exemplary environment in which an exemplary embodiment of an edge computing-based teleoperations service may be implemented.

The following detailed description refers to the accompanying drawings. The same reference numbers in different drawings may identify the same or similar elements. Also, the following detailed description does not limit the invention.

Current teleoperations infrastructures provide direct peer-to-peer communication between an asset (e.g., a vehicle, a robot, or other device being remotely controlled) and the remote-controlling device (e.g., a driving station or other device used to remotely control the asset). However, the teleoperations infrastructure does not include backup devices or systems. For example, a lack of redundancy provisioned in the teleoperations infrastructure may compromise safety, reliability, security, and/or other facets of communication and teleoperations performance. Additionally, teleoperations infrastructures may use stateless communication.

According to exemplary embodiments, an edge computing-based teleoperations service is described. According to an exemplary embodiment, the edge computing-based teleoperations service uses edge computing services to provide support services. According to an exemplary embodiment, the support services may include management of geo-redundant remote-controlling devices, as described herein. For example, the edge computing device may select and manage an active or primary remote-controlling device and a backup or secondary remote-controlling device that may remotely control an asset when there is a failure associated with the active remote-controlling device. According to an exemplary embodiment, the support services may include an anchor service, as described herein, in which communications between the remote-controlled device and the (active) remote-controlling device are passed or relayed via an edge computing device of an edge computing network. According to an exemplary embodiment, the support services may include an artificial intelligence (AI) service. For example, based on the anchor service, the edge computing device may learn and provide remote-controlling services when needed, as described herein. For example, when a switchover between the active remote-controlling device and the backup remote-controlling device is invoked (e.g., due to a communication problem or other failure associated with the active remote-controlling device), the edge computing device may provide remote-controlling services until the switchover procedure is completed.

According to an exemplary embodiment, the support services may include a state (both communication and system states) transfer service, as described herein. For example, as a part of handover procedure between edge networks, an edge computing device of a source edge network may store and transfer state information to an edge computing device of a target edge network. The state information may relate to the remote-controlled device, edge device, remote-controlling device and/or other context information of relevance.

In view of the foregoing, the edge computing-based teleoperations service may improve reliability, security, safety, and performance in relation to communications and other facets of a teleoperations service.

FIG. 1 is a diagram illustrating an exemplary environment 100 in which an exemplary embodiment of the edge computing-based teleoperations service may be implemented. As illustrated, environment 100 includes access network 105, a multi-access edge computing (MEC) network 115-1 through 115-1+R (also referred to collectively as MEC networks 115, and individually or generally as MEC network 115), and a core network 120. Access network 105 includes access devices 107 (also referred to individually or generally as access device 107). MEC network 115 includes MEC devices 117 (also referred to individually or generally as MEC device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include an additional and/or a different application service layer network. Additionally, or alternatively, other networks not illustrated in FIG. 1 may be included, such as an X-haul network (e.g., backhaul, mid-haul, fronthaul, etc.) or another type of network (e.g., a packet data network (PDN), the Internet, or other type of network), as described herein.

The number, the type, and the arrangement of network devices, and the number of end devices 130 are exemplary. A network device, a network element, or a network function (also referred to as a network device) may be implemented according to one or multiple architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and a network management plane. Environment 100 may include other types of planes of communication. A message communicated in support of the edge computing-based teleoperations service may use at least one of these planes of communication. Additionally, an interface of a network device may be modified relative to an interface defined by a standard, such as Third Generation Partnership Project (3GPP), International Telecommunication Union (ITU), European Telecommunications Standards Institute (ETSI), GSM Association (GSMA), Open RAN (O-RAN) Alliance, other entity), an interface not defined by a standard, or a new interface of the network device may be provided in order to support the communication (e.g., higher quality transmission and reception of messages, information elements (IE), attribute value pairs (AVPs), etc.) between network devices that support the edge computing-based teleoperations service, as described herein. According to various exemplary implementations, the interface of a network device may be a service-based interface, a reference point-based interface, an O-RAN interface (e.g., virtual and/or proxy), a future generation interface, or other type of interface.

Access network 105 may include one or multiple networks of one or multiple types and technologies. For example, access network 105 may be implemented to include a Fifth Generation (5G)-access network (5G-AN) or a 5G-RAN (referred to herein as simply a 5G-RAN)), a future generation RAN (e.g., a Sixth Generation (6G) RAN or subsequent generation RAN). Access network 105 may include a legacy RAN (e.g., a Third Generation (3G) RAN, a Fourth Generation (4G) or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), an optical network, or another type of network that provides access to or can be used as an on-ramp to access network 105, MEC network 115, and/or core network 120.

Access network 105 may include different and multiple functional splitting, such as options 1, 2, 3, 4, 5, 6, 7, or 8 that relate to combinations of access network 105 and core network 120 including an Evolved Packet Core (EPC) network and/or a NG core (NGC) network, or the splitting of the various layers (e.g., physical layer, Media Access Control (MAC) layer, RLC layer, and PDCP layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., non-standalone NR, standalone NR, etc.).

According to some exemplary embodiments, access network 105 may be implemented to include various architectures of wireless service, such as, for example, macrocell, microcell, femtocell, picocell, metrocell, new radio (NR) cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, licensed radio spectrum, unlicensed radio spectrum, above mm wave), and/or other attributes or technologies used for radio communication.

Depending on the implementation, access network 105 may include one or multiple types of network devices, such as access devices 107. For example, access device 107 may include a next generation Node B (gNB), an evolved Long Term Evolution (eLTE) eNB, an evolved Node B (eNB), a radio network controller (RNC), a remote radio head (RRH), a baseband unit (BBU), a radio unit (RU), a CU, a DU, a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB), 5G ultra-wide band (UWB) nodes, a future generation wireless access device (e.g., a 6G wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, etc.) via soft and hard-bonding based on demands and needs. Access device 107 may be an indoor device or an outdoor device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), 2D beamforming, antenna spacing, tilt (relative to the ground), radiation pattern, directivity, elevation, planar arrays, and so forth.

MEC network 115 includes a network that provides the edge computing-based teleoperations service. As illustrated, MEC network 115 may be located at an edge of a network, such as access network 105. Although not illustrated, MEC network 115 may be co-located with another type of network, such as core network 120. Alternatively, MEC network 115 may not be co-located. MEC network 115 may be implemented using one or multiple technologies including, for example, network function virtualization (NFV), containers, SDN, cloud computing, Infrastructure-as-a-Service (IaaS), Platform-as-a-Service (PaaS), Software-as-a-Service (SaaS), or another type of network technology.

Depending on the implementation, MEC network 115 may include various types of network devices that are illustrated in FIG. 1 as MEC devices 117. For example, MEC device 117 may include a virtual network device (e.g., virtualized network function (VNF), server, host, container, hypervisor, virtual machine, network function virtualization infrastructure (NFVI), and/or other types of virtualization element, layer, hardware resource, operating system, software resource, engine, etc.) and/or a non-virtual network device to provide the edge computing-based teleoperations service, as described herein.

Additionally, depending on the implementation, MEC devices 117 may include other types of network devices, such as an orchestrator (e.g., a network function virtualization orchestrator (NFVO), a mobile edge (ME) orchestrator, etc.), a virtualized infrastructure manager (VIM), a virtual network function manager (VNFM), an ME platform manager, an operations support system (OSS), a local domain name system (DNS), registries, a traffic rules controller, an ME platform, and/or other types of network devices (e.g., routers, core devices 122, an ingress device, a load balancer, etc.), and network resources (e.g., storage devices, communication links, etc.).

According to an exemplary embodiment, MEC devices 117 include logic that provides the edge computing-based teleoperations service. According to an exemplary embodiment, MEC device 117 may include logic that provides a geo-redundant QoS/QoE compliant service. The geo-redundant service may include MEC device 117 selecting a primary or active remote-controlling device (e.g., end device 130) to provide teleoperations services for a remote-controlled device (e.g., end device 130). Additionally, the geo-redundant service may include MEC device 117 selecting a secondary or backup remote-controlling device to provide teleoperations service for the remote-controlled device when an issue occurs with the active remote-controlling device. The number of secondary remote-controlling devices selected may be configurable (e.g., one, two, three, or another number) and can operate in Active-Active, Active-Standby, and any other relevant modes.

The selection of the primary and secondary remote-controlling devices may be based on various criteria, such as load conditions, reliability of a connection, performance metric of the connection (bandwidth, latency, error rate, drop rate, threat-level, or other quality of service/experience metric), and/or another configurable criterion. MEC device 117 may store information (e.g., in a database or other type of data structure) that indicates remote-controlling devices available for selection and other information to establish communication and provisioning of the teleoperations service with the primary and secondary remote-controlling devices.

MEC device 117 may include a watchdog service that monitors communications with remote-controlling devices to identify a communication state or loss thereof. For example, MEC device 117 may perform pinging, polling, and/or use other mechanisms, signaling, or messaging to identify the communication or connection state (e.g., up, down, intermittent, etc.), and determine whether a switchover or failover procedure should be invoked, as described herein. The switchover or failover procedure may relate to the loss of connection with the primary remote-controlling device or an intermittent or unreliable connection. Alternatively, the failover procedure may relate to a failure at the remote-controlling device (e.g., hardware failure, software failure, etc.) or other type of event (e.g., loss of power, health of remote-controlling device (e.g., virus, etc.), inability of user to remote control the remote-controlled device via the remote-controlling device). The switchover or failover procedure may include initiating a failover to a secondary remote-controlling device in which the secondary remote-controlling device will act as the primary remote-controlling device. MEC device 117 may also monitor connection states with a secondary remote-controlling device, and if compromised, manage the selection of another secondary remote-controlling device. MEC device 117 may also manage the connection state with the remote-controlled device via access network 105.

According to an exemplary embodiment, MEC device 117 may include logic that provides an anchor service in which communications between end devices 130 (e.g., a remote-controlled device and a remote-controlling device) may traverse MEC device 117. For example, when the teleoperations service relates to a vehicle, a drone, a robot or other end device 130 (e.g., remote-controlled device), MEC device 117 may receive video streams (e.g., video or video and audio) from end device 130. MEC device 117 may relay the video streams to a driving station, a controller device, or other end device 130 (e.g., remote-controlling device). MEC device 117 may be an anchor device relative to the remote-controlled device. MEC device 117 may also be an anchor device relative to multiple access devices 107 of access network 107. According to some exemplary implementations, MEC device 117 may decode the video streams, which may be encoded, and/or may transcode the video streams. Depending on the teleoperations service and/or the remote-controlled device, MEC device 117 may receive other information, messages, commands, requests, sensor information, and/or raw data, which may be processed and/or relayed to the remote-controlling device. Conversely, MEC device 117 may receive control commands from the remote-controlling device and relay the control commands to the remote-controlled device via access network 105. MEC device 117 may also receive other information, messages, commands, requests, or other input, which may be processed (e.g., encoded, converted, translated, decoded, etc.) or relayed to the remote-controlled device.

According to an exemplary embodiment, MEC device 117 may include logic that provides an AI service. For example, MEC device 117 may use one or multiple types of learning-based algorithms, such as reinforcement-based learning, unsupervised learning, semi-supervised learning, supervised learning, deep learning, learning from situation awareness and successful handling of obstacles, and/or artificial intelligence or other type of device intelligence. MEC device 117 may include a model that has been trained to perform the functions of a remote-controlling device (e.g., end device 130). For example, the model may include a Generative Adversarial Network (GAN), a neural network, a probabilistic model, a Markov Chain, an autoencoder, a variational autoencoder, a non-probabilistic model, or other type of model. MEC device 117 may include a model that may be teleoperations service specific, application specific of a teleoperations service, or some other configuration that supports the AI service, a remote-controlled device, and/or the teleoperations service. Additionally, in collaboration with the anchor service, MEC device 117 may learn remote-controlling functions that support the teleoperations service in a context-aware and internal/external threat-sensitive manner based on analytical evaluation of communications exchanged between remote-controlling devices and remote-controlled devices. The model may be updated based on feedback from remote-controlled devices, remote-controlling devices, and/or other sources (e.g., an administrator, service provider, third party, static and mobile sensors, etc.). MEC device 117 may select and use the latest and most effective model(s) for network and service operations. MEC device 117 may also use the video analytics of video streams to select control commands to be transmitted to the remote-controlled device.

According to an exemplary embodiment, MEC device 117 may provide a remote-controlling service, which is supported by the AI service, when a failover procedure is invoked. For example, in collaboration with the geo-redundancy service, when the primary (active) remote-controlling device (or user) is no longer able to remotely-control the remote-controlled device (e.g., loss of communication, intermittent communication, or other reason), MEC device 117 may take over the role until the failover procedure is complete and the secondary remote-controlling device becomes the primary (active) remote-controlling device, as described herein.

MEC device 117 may include or use auto-scaling rules for teleoperations services that yield the most efficient use of resources (e.g., physical, logical, virtual, hardware, software, etc.). MEC device 117 may include neural networks, look-up tables (e.g., state, action, result, commands, inputs, etc.), video analytics, libraries, historical information, geographic maps, aerial maps, and/or other types of elements, data, and/or information that may support the teleoperations service. According to various exemplary embodiments, the AI service may be, in whole or in part, local to MEC network 115, external from MEC network 115, or a combination of local and external/remote (e.g., collaborative). For example, a network device of an external network (e.g., PDN) may include one or more components that provide one or more functions of the AI service, as described herein.

According to an exemplary embodiment, MEC device 117 may include logic that provides a state transfer service. For example, when a remote-controlled device (e.g., end device 130) is mobile and traverses a geographic area, a handover procedure between access devices 107 (e.g., source and target access devices 107) of access network 105 may be triggered. In some cases, the target access device 107 may not be associated with or within a domain of MEC device 117 of MEC network 115. According to such circumstances, the state transfer service may manage a handover procedure between the source MEC network 115 and a target MEC network 115.

According to an exemplary embodiment, MEC device 117 may store stateful information relating to a teleoperations service session. The stateful information may relate to the remote-controlling device (e.g., primary, secondary) and the remote-controlled device (e.g., end devices 130). For example, with reference to the remote-controlled device, the stateful information may include the most recent video stream, the speed, direction of movement, and other operational states of the remote-controlled device, geographic map information relating to the position of the remote-controlled device, recent commands executed by the remote-controlled device, information relating to the model or type of remote-controlled device, with or without passengers, cargo, and/or other state information of relevance. Additionally, for example, with reference to the remote-controlling device, the stateful information may include the most recent commands sent to the remote-controlled device, destination information, weather information, traffic and route information, level of autonomy (e.g., Society of Automotive Engineers (SAE) level of driving automation; 5G Automotive Association (5GAA) autonomous mode, or other autonomy level associated with a standard or entity), and/or other state information of relevance.

According to an exemplary embodiment, MEC device 117 may store information indicating neighboring MEC networks 115 and/or neighboring MEC devices 117 of neighboring (under same or different administration) MEC networks 115 that may support the teleoperations service of relevance. MEC device 117 may select a suitable neighboring MEC network 115 to transfer stateful information pertaining to the teleoperations service session. MEC device 117 may select the neighboring MEC network 115 that has within its domain the target access device 107. MEC device 117 may provide the stateful information to the selected neighboring MEC network 115.

According to an exemplary embodiment, the source MEC network 115 and/or source MEC device 117 may perform a soft handover procedure (e.g., connect-before-break) with the neighboring (target) MEC network 115 and/or target MEC device 117 such that a radio link with the remote-controlled device may always be present. According to other exemplary embodiments, a hard handover procedure may be performed.

According to an exemplary embodiment, MEC device 117 may include logic that provides other support services. For example, MEC device 117 may use the video streams to generate maps. The maps may be used for navigation or other reasons apart from the teleoperations service, such as by third party applications. MEC device 117 may also generate augmented reality (AR) and/or virtual reality (VR) annotations in relation to the video streams. MEC device 117 may provide these annotated video streams to passengers of a vehicle subject to the edge computing-based teleoperations service, or other persons, third parties, and so forth.

According to other embodiments, the video analytics of the video streams or analytics of other types of sensors of the remote-controlled device (e.g., heat sensors, light sensors, audio sensors, chemical sensors, or other type of sensor) may be used to support other services, which may or may not relate to the teleoperations service. For example, MEC device 117 may identify various events, such as the presence of a fire, an accident (e.g., a motor vehicle accident), a broken utility pole, a hidden sign (e.g., due to tree or bush growth, etc.), a person (e.g., missing person, lost child), a lost pet, or other object or event of interest. MEC device 117 may provide information relating to the detected event to a suitable device or entity (e.g., law enforcement, a utility company, governmental agency, fire department, etc.).

MEC network 115 may host one or multiple application services. The application services may or may not pertain to the edge computing-based teleoperations service, as described herein. For example, the application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, AR, VR, etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, and/or other types of mobile edge application services.

Core network 120 may include one or multiple networks of one or multiple network types and technologies. Core network 120 may include a complementary network of access network 105. For example, core network 120 may be implemented to include a next generation core (NGC) network, an Evolved Packet Core (EPC) of an LTE, an LTE-Advanced, an LTE-A Pro, and/or a future generation core network (e.g., a 6G core network, etc.).

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

End devices 130 include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. Additionally, as described herein, end device 130 may be implemented as a remote-controlled device or a remote-controlling device. For example, as a remote-controlled device, end device 130 may be a vehicle (e.g., car, truck, etc.), a drone or other type of aerial vehicle, a robot (e.g., delivery robot, medical-based robot, etc.), or other type of device associated with a known or future teleoperations service. Depending on the implementation, end device 130 may include one or multiple video cameras, microphones, and other types of sensors (e.g., Light Detection and Ranging (LIDAR), heat sensor, light sensor, chemical sensor, temperature sensor, a global positioning device, threat sensors, or another type of sensor or data collector).

End device 130 may include other processing components associated with sensors, such as an aggregator, an encoder, a decoder, other components that support remote control of end device 130 (e.g., command interpretation and execution), and so forth. End device 130 may include logic that transmits information to a remote-controlling device via MEC network 115, and may receive information from the remote-controlling device via MEC network 115. End device 130 may receive commands from the remote-controlling device via MEC network 115 or from MEC network (e.g., when the remote-controlling service of MEC device 117 is active), and include logic to interpret and execute the commands. For example, in relation to a remote-controlled vehicle, various commands such as turn left, turn right, stop, brake, accelerate, and other types of commands that control the movement and/or operation of the vehicle may be received and executed.

According to various exemplary implementations, end device 130 may or may not include buffering or caching of control commands. For example, when end device 130 does not include buffering, the latest command may be interpreted and executed. However, a command of a sequence of commands may be lost due to lack of buffering. Alternatively, when end device 130 does include buffering, determining the sequential order of commands to execute may be needed, particularly when there may be multiple commands stored and the commands may be received in an improper order. Additionally, depending on the size of the buffer and size of a command (e.g., in terms of bytes, for example), such configurations may negatively impact the real or near-real-timeliness of command execution. For example, some commands may be invalid for practical reasons due to the duration of time that transpires leading up to execution.

Also, for example, as a remote-controlling device, end device 130 may include a computer (e.g., a tablet, a desktop, a laptop, a netbook, etc.) with various peripherals (e.g., a display, a joystick, pedals, steering wheel, or other input and/or output devices). Depending on the level of autonomy associated with the remote-controlled device and/or teleoperations service, the remote-controlling device may or may not be operated by a human user.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and flavors of network slicing, DC service, and/or other types of connectivity services. Additionally, end device 130 may include one or multiple communication interfaces that provide one or multiple (e.g., simultaneous) connections via the same or different RATs, frequency bands, carriers, network slices, and/or other communication medium (e.g., wired, etc.). The multimode capabilities of end device 130 may vary among end devices 130.

FIGS. 2A-2E are diagrams illustrating an exemplary process of an exemplary embodiment of the edge computing-based teleoperations service. As illustrated, according to an exemplary scenario, environment 200 includes a remote-controlled device 205 (e.g., end device 130), such as a remotely-operated autonomous truck, gNBs 215-1 and 215-2 (e.g., access device 107), MEC network 115 and MEC devices 117, and remote-driving stations 210-1 and 210-2 (e.g., end devices 130). According to this scenario, remote-driving station 210-1 may be an active station and remote-driving station 210-2 may be backup station.

Figure 2A:
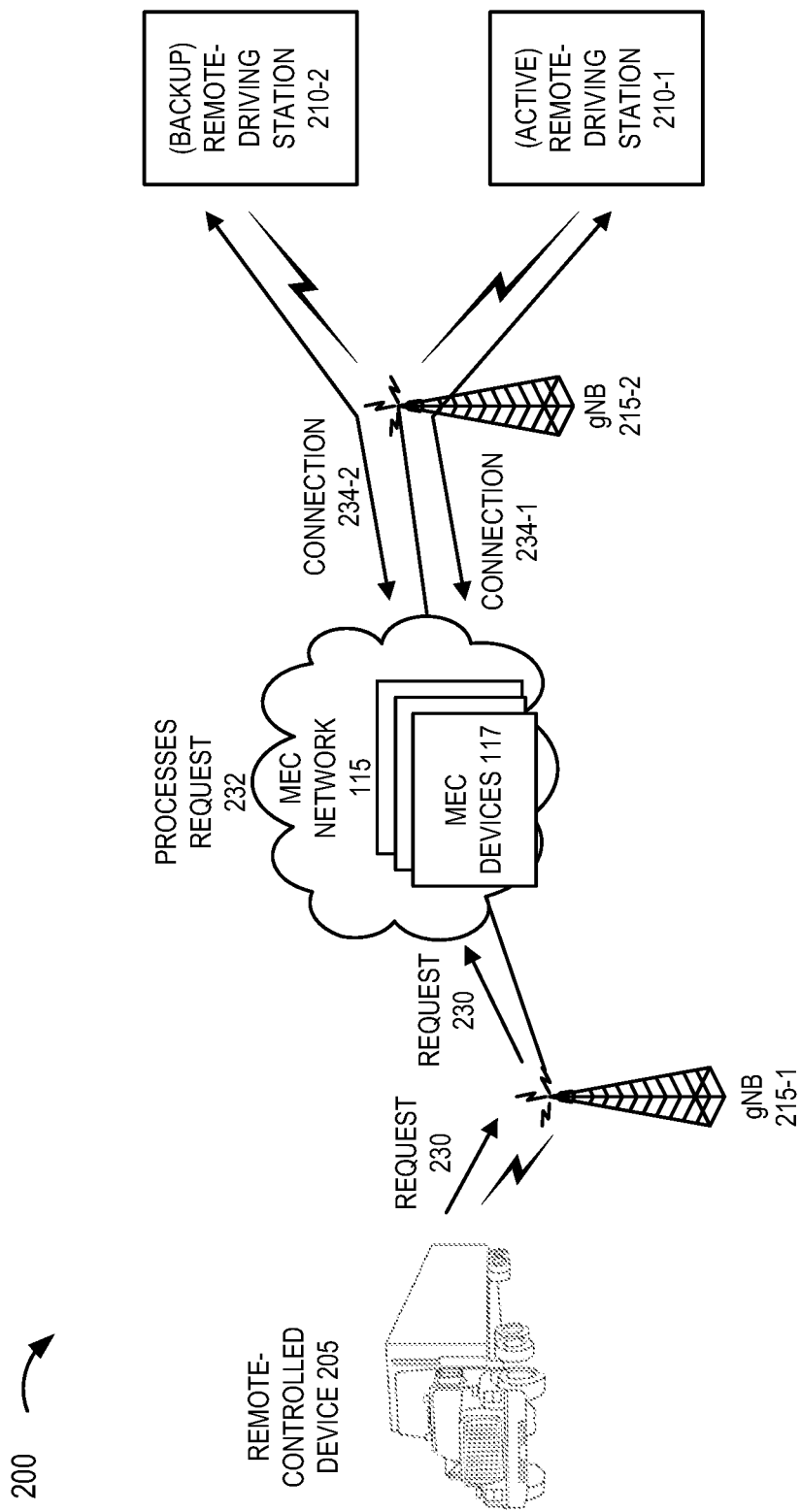
FIGS. 2A-2E are diagrams illustrating an exemplary process of an exemplary embodiment of the edge computing-based teleoperations service.

Referring to FIG. 2A, remote-controlled device 205 may initiate a request to start a trip (illustrated as request 230). MEC device 117 may receive and process the request 232. For example, MEC device 117 may select a remote driving station based on one or multiple criteria, such as load, reliability, nearest, and/or other criterion, as described herein, and establish connections 234 with remote-driving station 210-1 and 210-2. As part of the selection process, MEC device 117 may determine which remote-driving station 210 is the active and which is the backup.

Figure 2B:
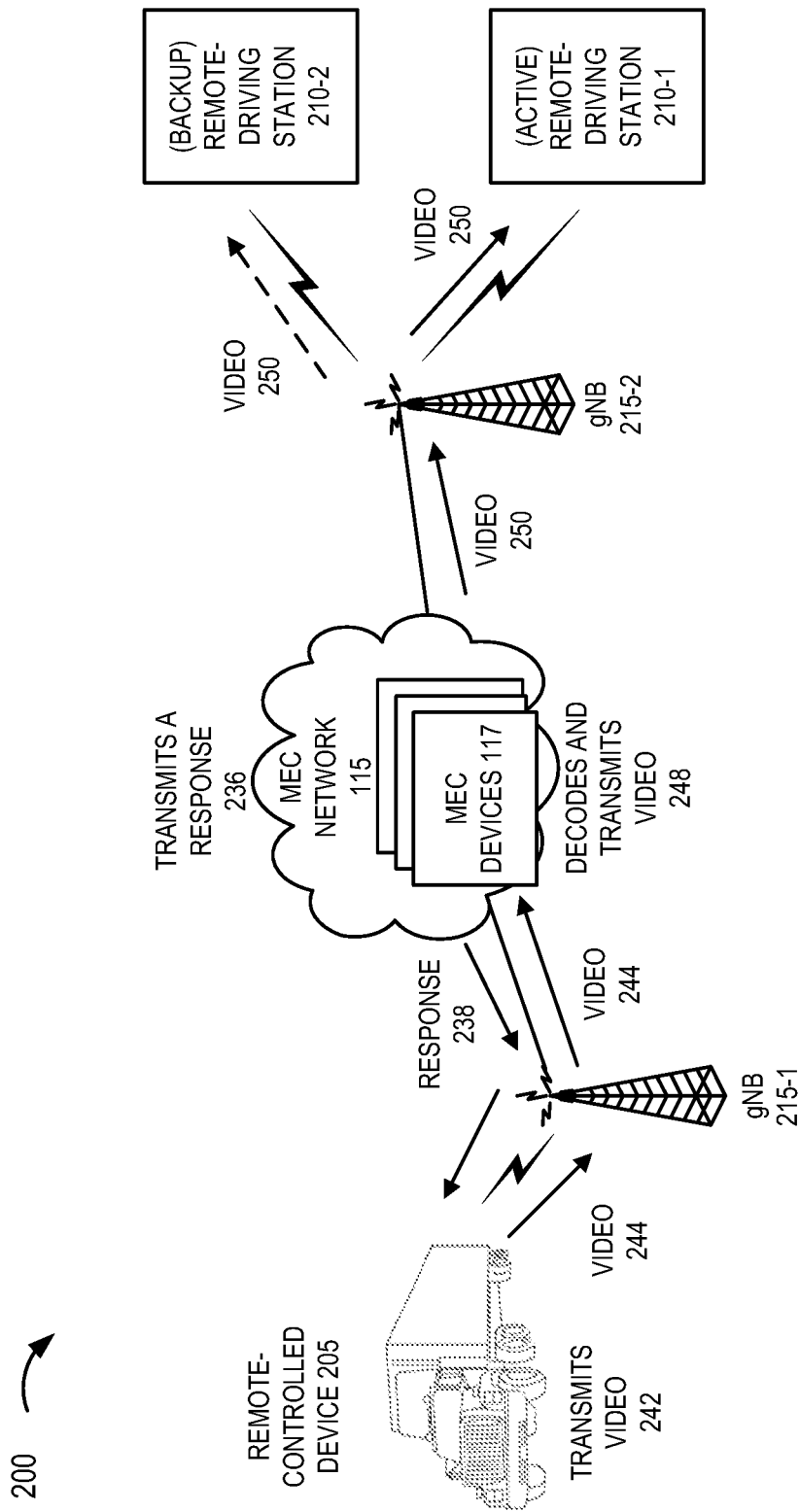

Referring to FIG. 2B, when MEC device 117 receives confirmation from remote-driving stations 210, MEC device 117 may transmit a response 236 to remote-controlled device 205, which is illustrated as a response 238. For example, the response 226 may indicate a start-up procedure. Remote-controlled device 205 may transmit an encoded video stream 242 to MEC device 117, which is illustrated as video 244, and MEC device 117 may decode and transmit the video stream 248 to remote-driving station 210-1, which is illustrated as video 250. According to some exemplary implementations, MEC device 117 may optionally transmit the video stream 250 to backup remote-driving station 210-2. Although not illustrated, remote-controlled device 205 may transmit other information of relevance, such as location information (e.g., latitude and longitude, or other type of positioning coordinates), speed, direction, and other sensor information that relates to the operational state of remote-controlled device 205.

Figure 2C:
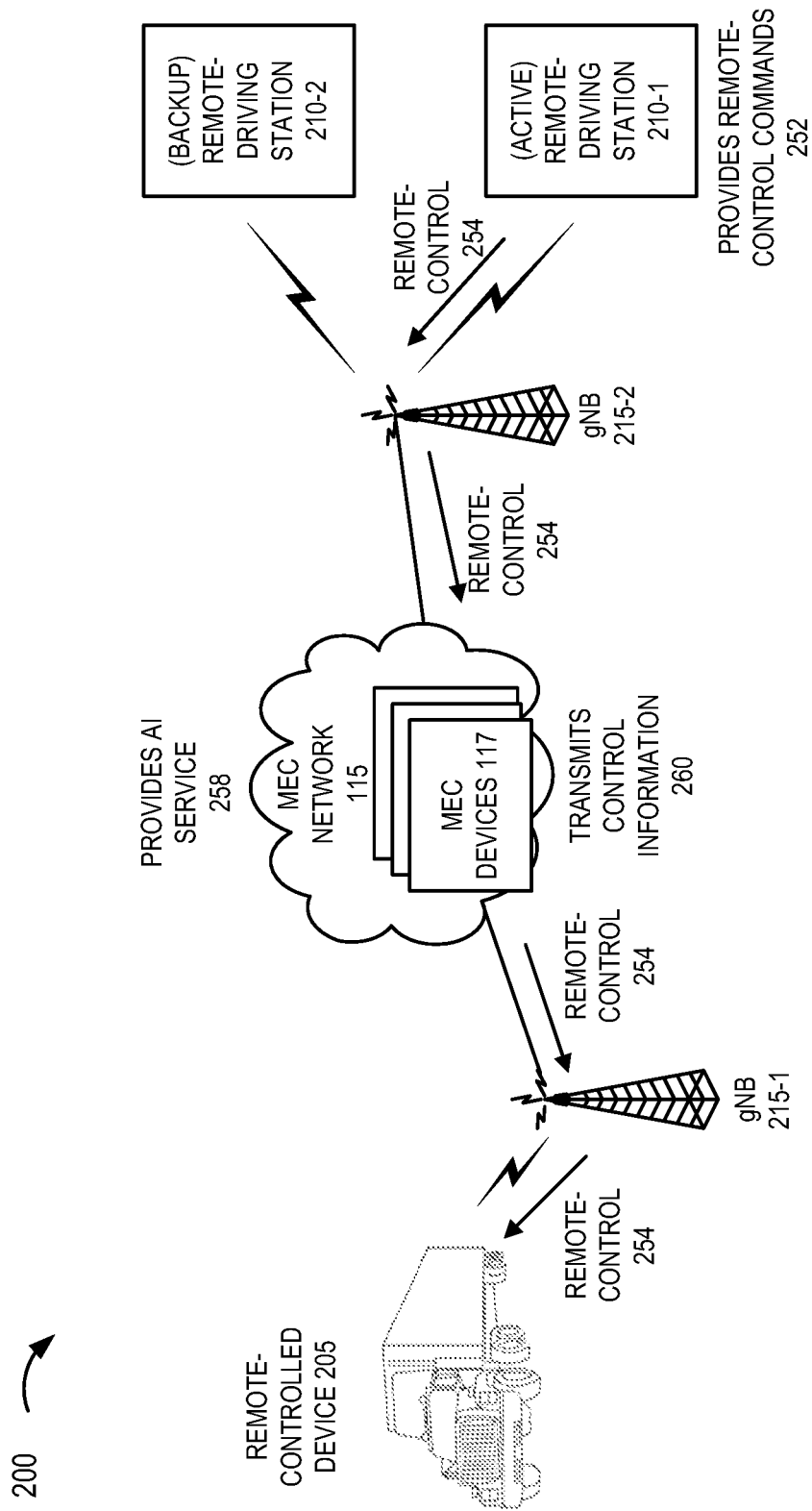

Referring to FIG. 2C, based on the received video stream, (active) remote-driving station 210-1 may provide remote-control commands 252, which may be transmitted to remote-controlled device 205 (illustrated as remote-control 254) via MEC device 117. MEC device 117 may provide the AI service 258 based on the communications between remote-controlled device 205 and active remote-driving station 210-1. Additionally, as illustrated, MEC device 117 may transmit the control information 260 to remote-controlled device 205.

Figure 2D:
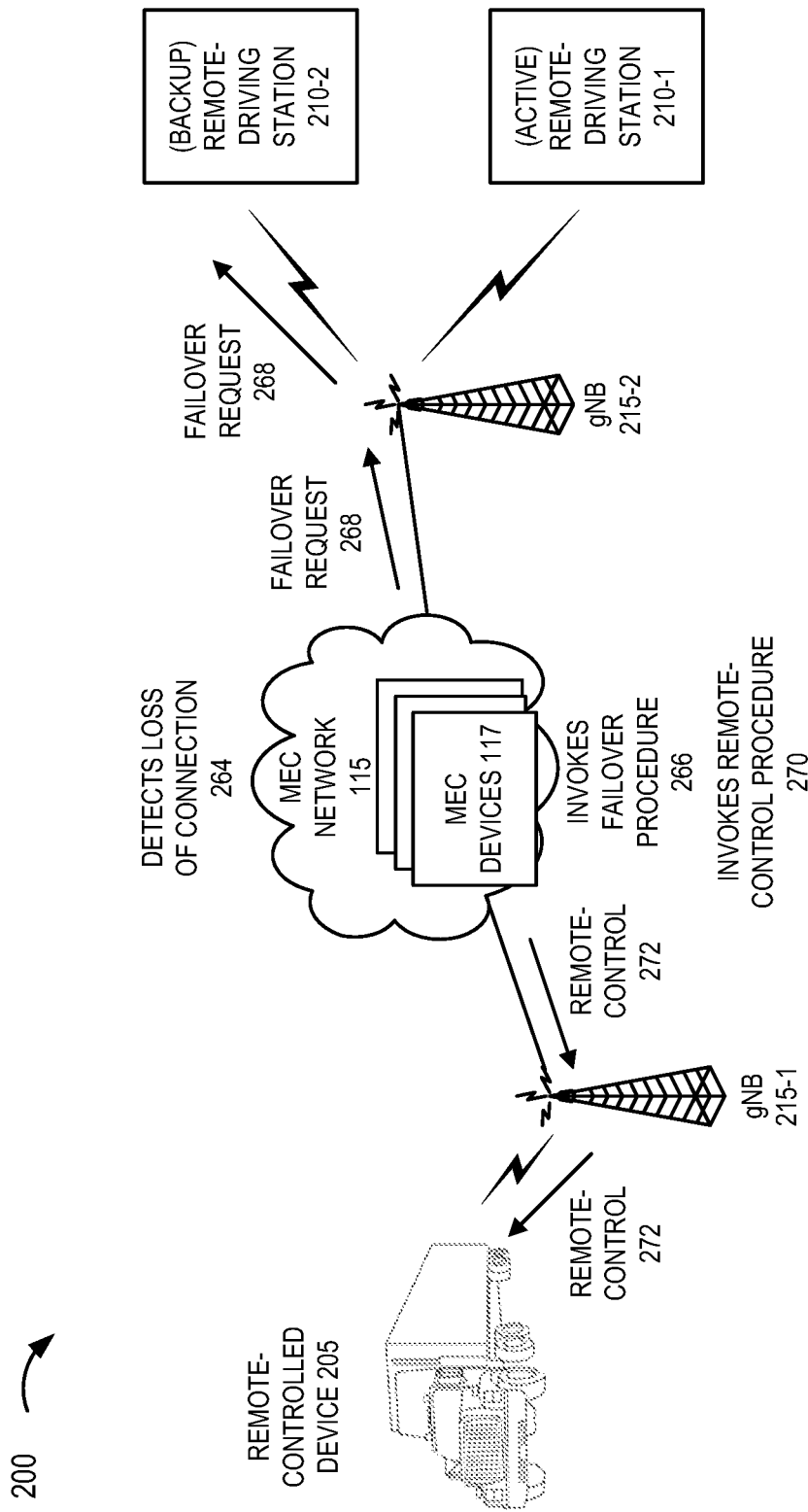

Referring to FIG. 2D, MEC device 117 may detect a loss of connection 264 based on the watchdog service or other type of issue that compromises the teleoperations service, and in response, invokes a failover procedure 266. As a part of the failover procedure, MEC device 117 may generate and transmit a failover request 268 to backup remote driving station 210-2. The failover request 268 may include a request for backup remote driving station 210-2 to act as the active remote-driving station.

MEC device 117 may also invoke a remote-control procedure 270. For example, MEC device 117 may act as the active remote-driving station based on the AI service, receive information from remote-controlled device 205, no longer relay such information to remote-driving station 210-1, and generate and transmit remote-control commands to remote-controlled device 205 (illustrated as remote-control 272).

Figure 2E:
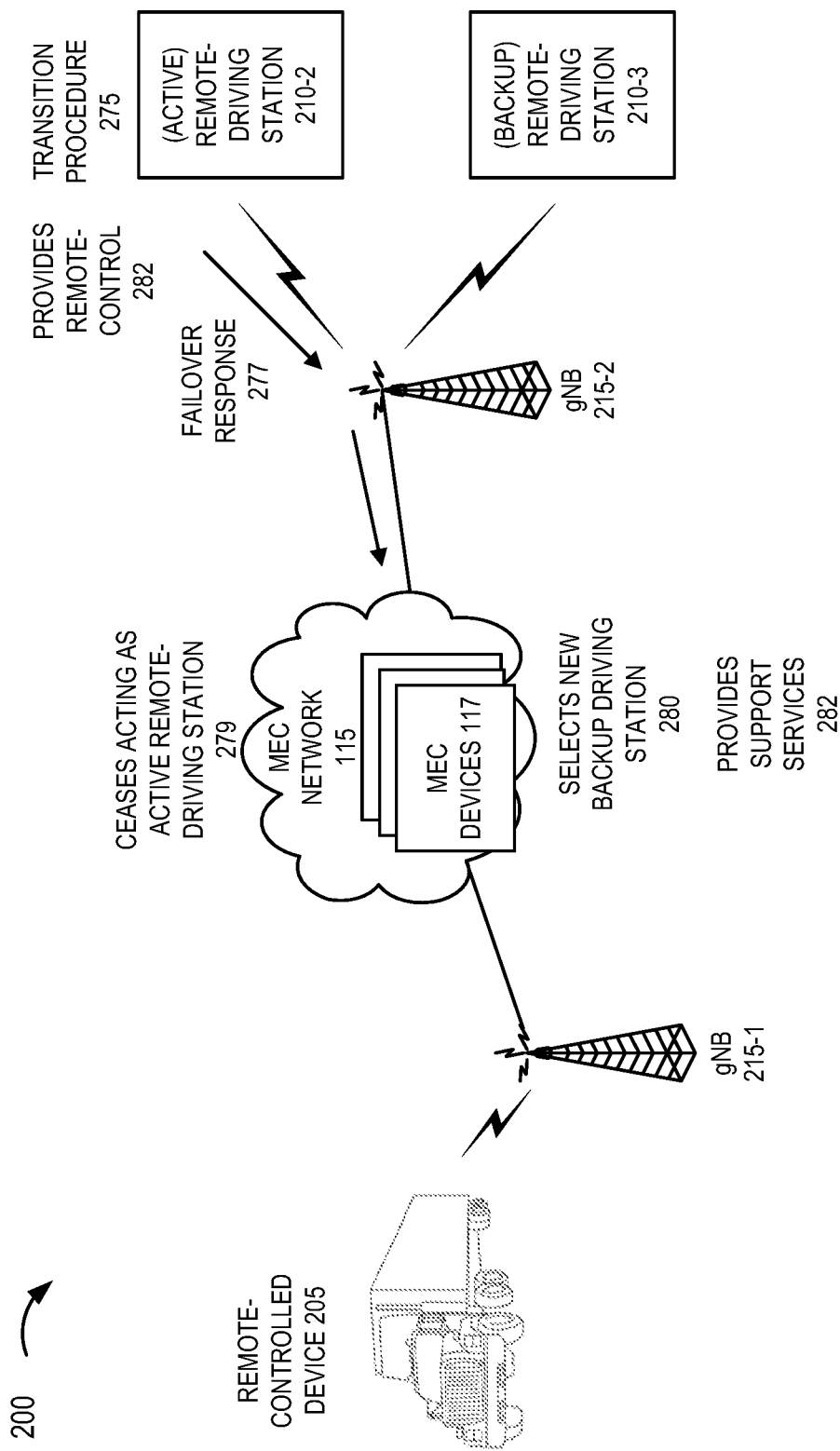

Referring to FIG. 2E, in response to receiving the failover request, remote-driving station 210-2 may invoke a transition procedure 275 to act as the active remote-driving station, and generates and transmits a failover response 277. Based on receiving the failover response 277, MEC device 117 may cease acting as the active remote-driving station 279. MEC device 117 may also select a new backup remote-driving station 280. MEC device 117 may further provide the support services 282, such as relay communications from remote-controlled device 205 to active remote-driving station 210-2, the AI service, the watchdog service, and other support services, as described herein.

Although FIGS. 2A-2E illustrate an exemplary embodiment of a process of the edge computing-based teleoperations service, according to other exemplary scenarios, the edge computing-based teleoperations service may perform additional operations, fewer operations, and/or different operations than those illustrated and described.

FIGS. 3A-3D are diagrams illustrating another exemplary process of an exemplary embodiment of the edge computing-based teleoperations service. As illustrated, according to an exemplary scenario, environment 300 includes a remote-controlled device 305 (e.g., end device 130), such as a remotely-operated drone, gNBs 215-1 through 215-4 (e.g., access device 107), MEC networks 115-1 and 115-2, MEC devices 117, and remote-control stations 210-1 through 210-4 (e.g., end devices 130). According to this scenario, remote-control station 210-1 may be an active station and remote-control station 210-2 may be backup station, and remote-controlled device 305 has wireless radio coverage from gNB 215-1.

Figure 3A:
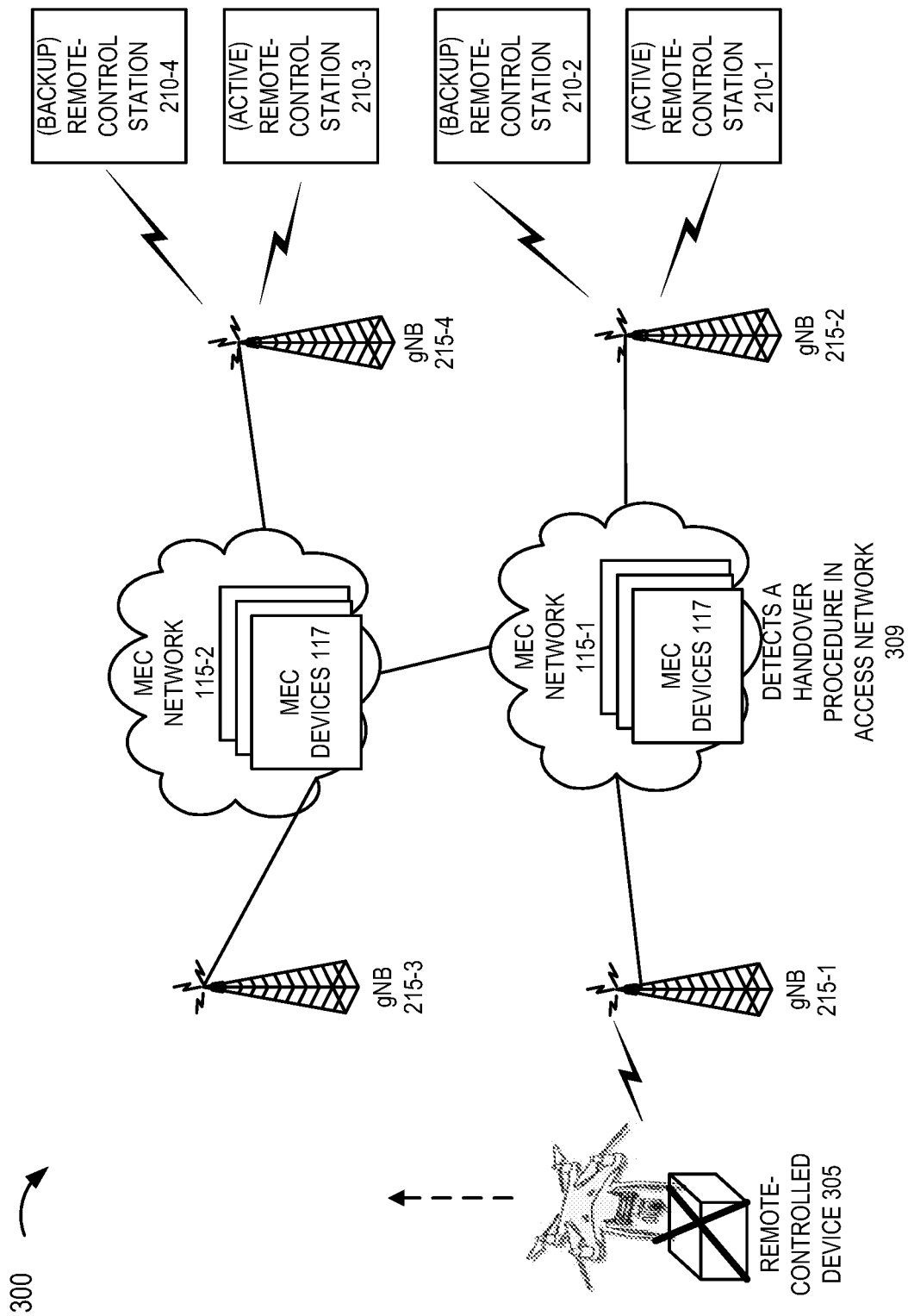
FIGS. 3A-3D are diagrams illustrating another exemplary process of an exemplary embodiment of the edge computing-based teleoperations service.
Figure 3B:
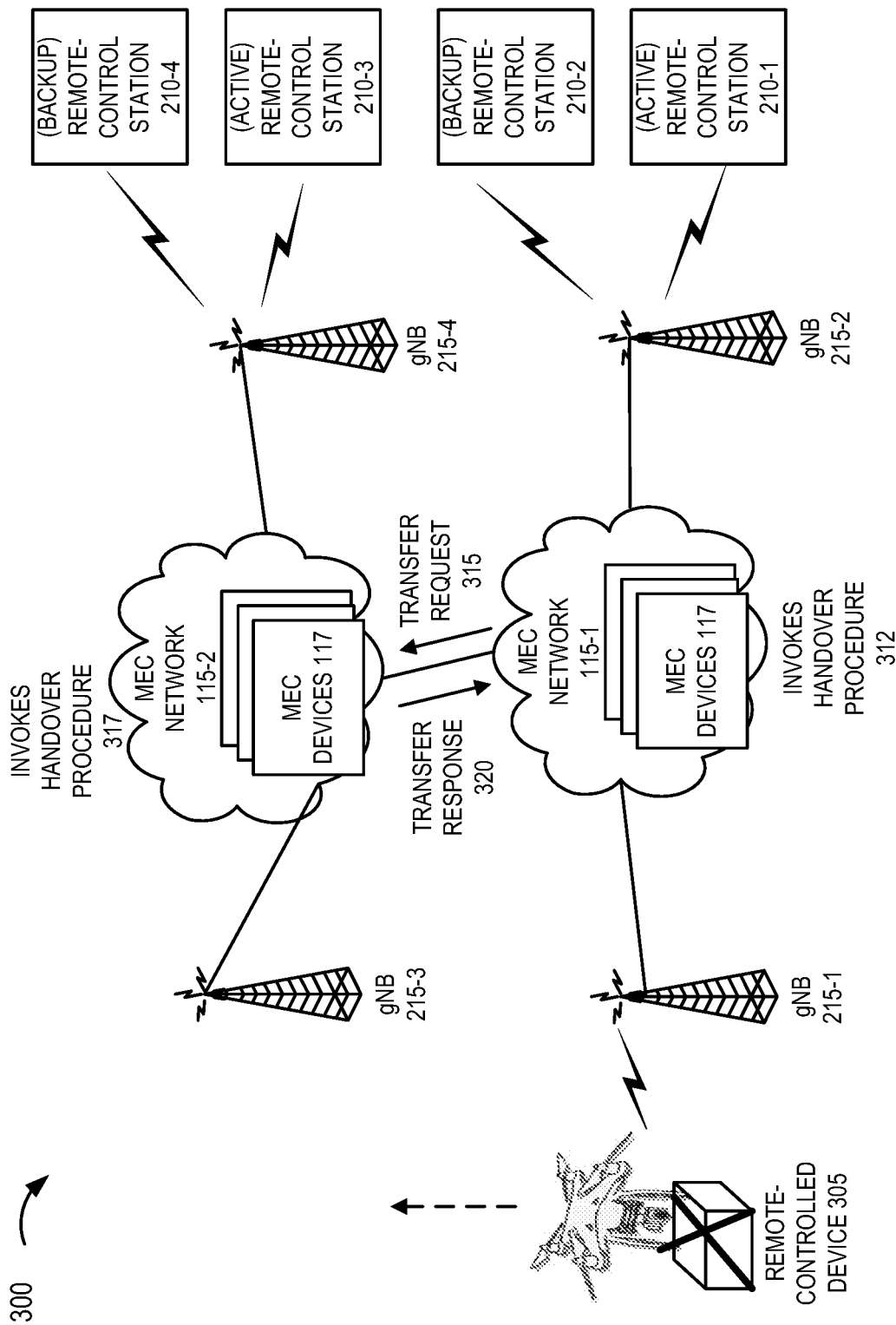

Referring to FIG. 3A, assume that remote-controlled device 305 is moving towards the radio coverage of gNB 215-3. MEC device 117 may detect a handover procedure in access network 309. For example, although not illustrated, gNB 215-1 may transmit a message to MEC device 117 indicating a handover with gNB 215-3 given the mobility of remote-controlled device 305. Referring to FIG. 3B, based on the detection of the handover procedure, MEC device 117 may invoke a handover procedure 312. For example, MEC device 117 may determine that gNB 215-3 is not associated with or within the domain or geographic area that MEC network 115 services. In response, MEC network 115-1 may perform a handover procedure 312. For example, MEC device 117 may perform a lookup and select a neighboring MEC network 115, which is associated with gNB 215-3 and may support the edge computing-based teleoperations service. MEC network 115-1 may generate and transmit a transfer request (illustrated as transfer request 315) to the selected MEC network, such as MEC network 115-2.

In response to receiving the transfer request 315, MEC network 115-2 may determine whether to accept the transfer request 315. According to this exemplary scenario, MEC network 115-2 may determine to accept the transfer request 315 and may invoke a handover procedure 317. Based on this determination, MEC network 115-2 may generate and transmit a transfer response (illustrated as transfer response 320) to MEC network 115-1.

Figure 3C:
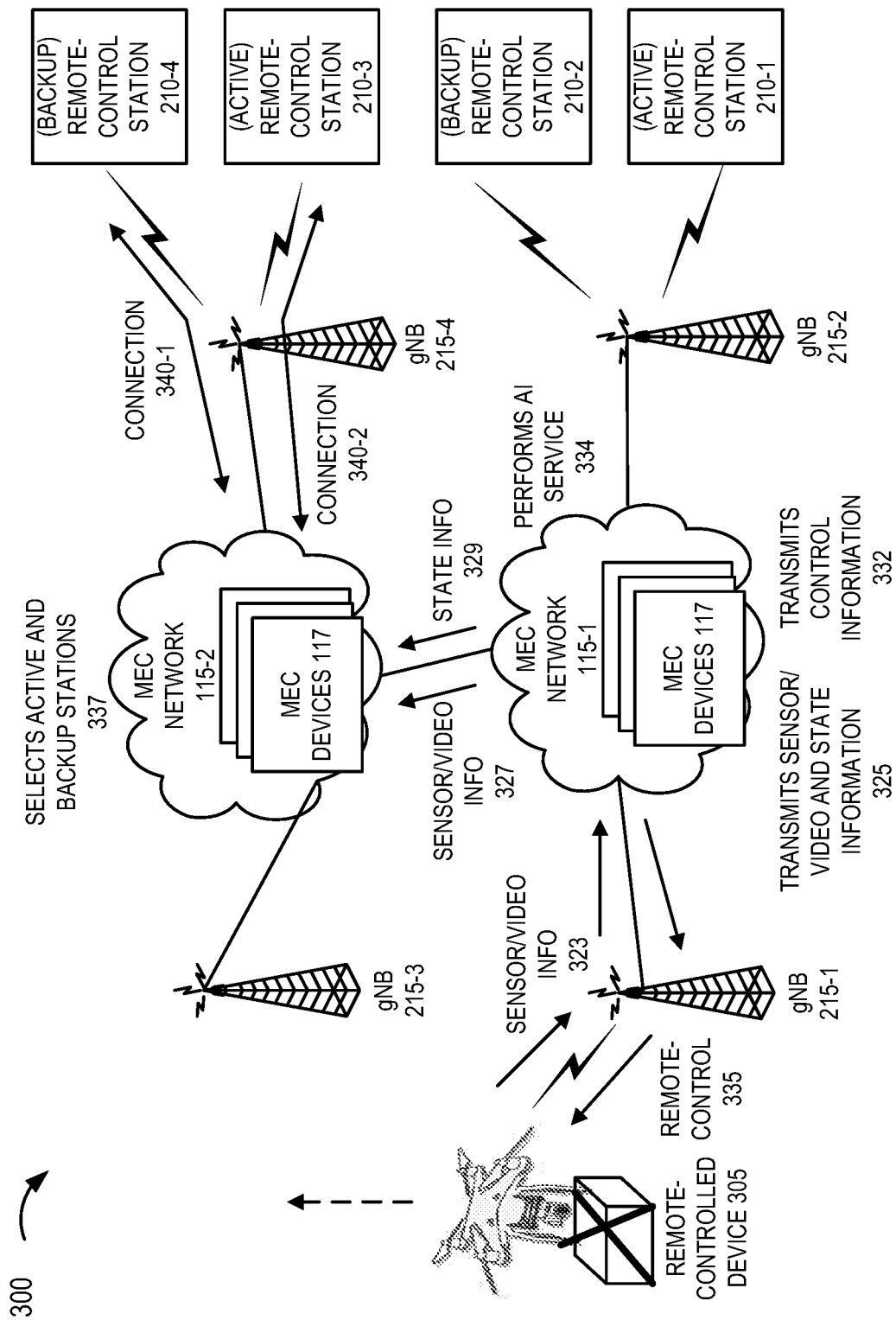

Referring to FIG. 3C, MEC device 117 of MEC network 115-1 may receive sensor/video information 323 from remote-controlled device 305, and may transmit the sensor/video, and state information 325 to MEC network 115-2, which is illustrated as sensor/video 327 and state information 329. Additionally, during the handover procedure, MEC network 115-1 may transmit control information 332 to remote-controlled device 305, which is illustrated as remote control 335. According to various exemplary implementations, active remote-control station 210-1 or the AI service of MEC network 115-1 may generate the remote-control commands, illustrated as performs AI service 334. The AI service may be performed during a portion of or during the entirety of the handover procedure. Additionally, as a part of the AI service, MEC network 115-1 may update a learned model of relevance and use the latest and most effective model(s) for network and service operations.

Figure 3D:
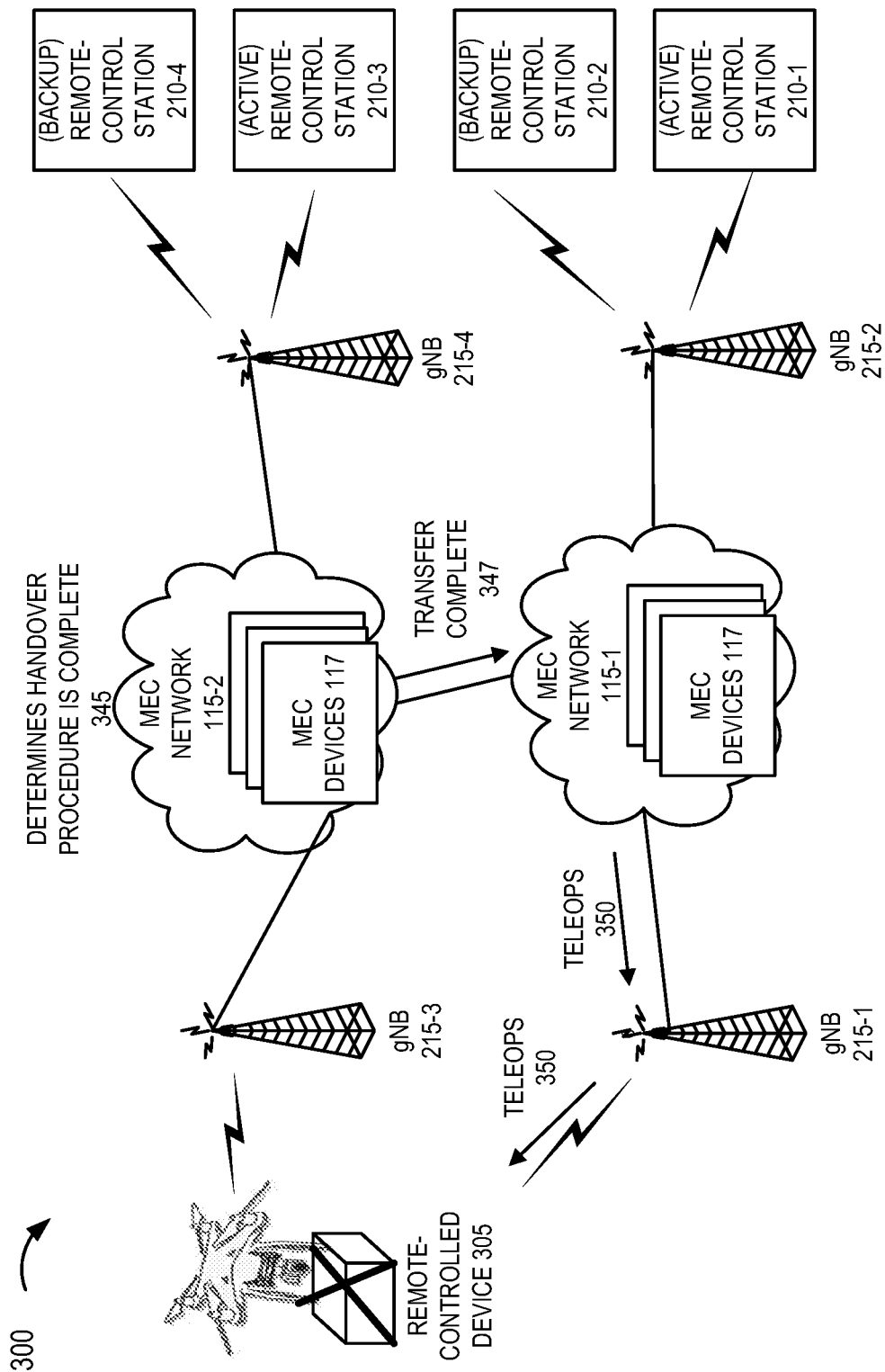

Additionally, as illustrated, MEC network 115-2 may select active and backup stations 337 based on a selection procedure. MEC network 115-2 may establish connections 340-1 and 340-2 with active remote-control station 210-3 and backup remote-control station 210-4. Referring to FIG. 3D, MEC network 115-2 may select MEC device 117 of MEC network 115-2 to provide the edge computing-based teleoperations service, and may determine that the handover procedure is complete 345. MEC network 115-2 may generate and transmit a transfer complete message to MEC network 115-1 (illustrated as transfer complete 347) to indicate the handover procedure has been completed. MEC device 117 of MEC network 115-1 may generate and transmit a teleoperations message (illustrated as teleops 350) to remote-controlled device 305 to indicate to start communication with MEC network 115-2. Thereafter, remote-controlled device 305 may receive the edge computing-based teleoperations service from MEC network 115-2.

Although FIGS. 3A-3D illustrate an exemplary embodiment of a process of the edge computing-based teleoperations service, according to other exemplary scenarios, the edge computing-based teleoperations service may perform additional operations, fewer operations, and/or different operations than those illustrated and described. For example, the active remote-control station and/or the backup remote-control station of MEC network 115-1 may be selected by MEC network 115-2.

FIG. 4 is a diagram illustrating exemplary components of a device 400 that may be included in one or more of the devices described herein. For example, device 400 may correspond to access device 107, MEC device 117, core device 122, end device 130, and/or other types of network devices (e.g., active and remote stations 210), as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to MEC device 117, software 420 may include an application that, when executed by processor 410, provides a function of the edge computing-based teleoperations service, as described herein. Additionally, for example, with reference to end device 130, software 420 may include an application that, when executed by processor 410, provides a function of a teleoperations service. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, or a reference interface, for example.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., MEC network 115) and/or another type of network (e.g., access network 105, etc.).

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
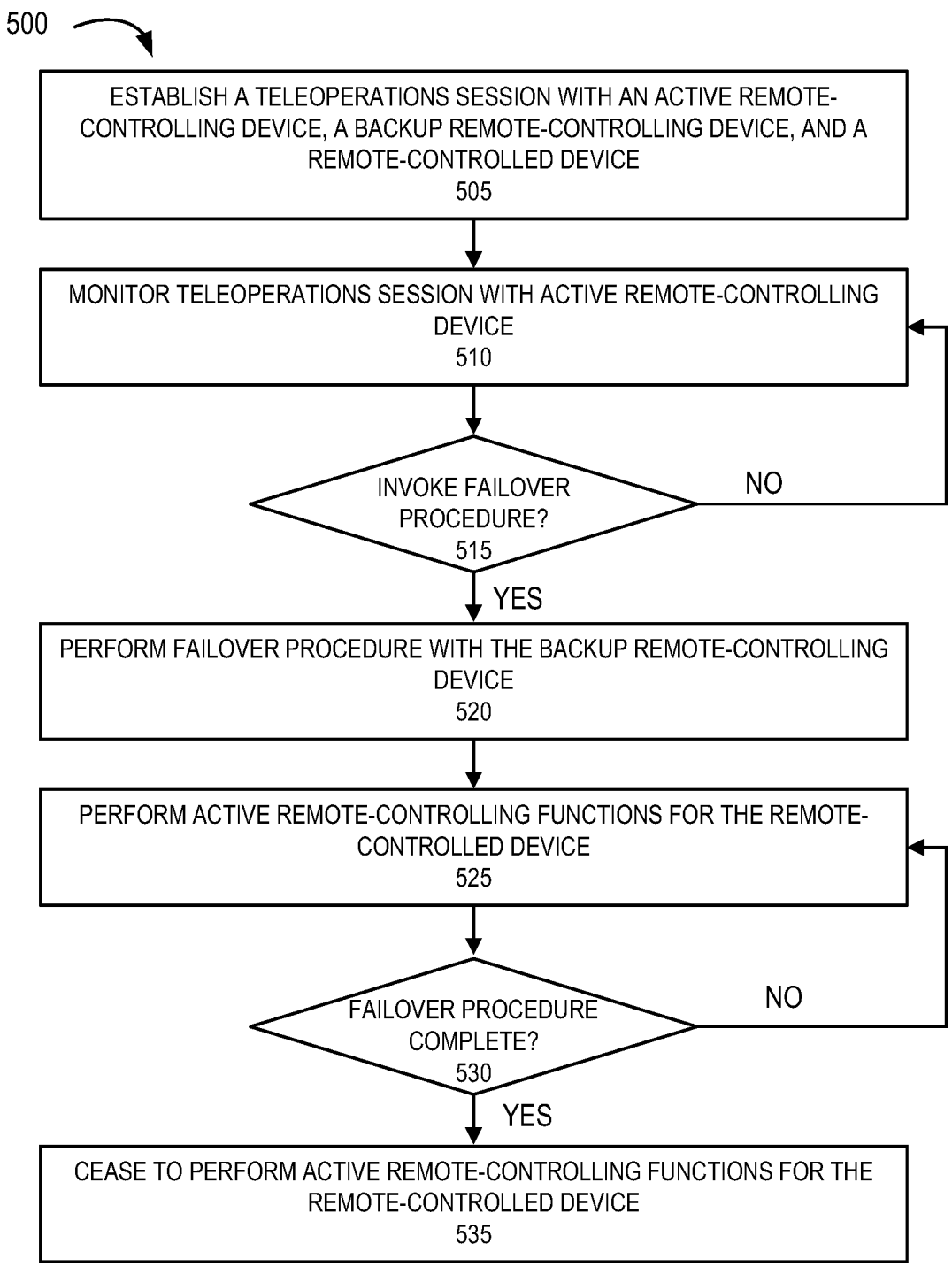
FIG. 5 is a flow diagram illustrating an exemplary process of an exemplary embodiment of the edge computing-based teleoperations service.

FIG. 5 is a flow diagram illustrating an exemplary process 500 of an exemplary embodiment of the edge computing-based teleoperations service. According to an exemplary embodiment, MEC device 117 may perform a step of process 500. According to an exemplary implementation, processor 410 executes software 420 to perform the step of process 500, as described herein. Alternatively, the step may be performed by execution of only hardware.

In block 505, MEC device 117 may establish a teleoperations service with an active remote-controlling device, a backup remote-controlling device, and a remote-controlled device, as described herein.

In block 510, MEC device 117 may monitor the teleoperations service with the active remote-controlling device, as described herein. For example, MEC device 117 may assess the communication connection (e.g., loss, intermittent, etc.) and/or other metrics of relevance to the teleoperations service.

In block 515, MEC device 117 may determine whether to invoke a failover procedure. For example, when the communication connection and/or other metrics are satisfactory (block 515-NO), MEC device 117 may continue to monitor the teleoperations session (process 500 returns to block 510). When the communication connection and/or other metrics are not satisfactory (block 515—YES), MEC device 117 may perform the failover procedure with the backup remote-controlling device, as described herein (block 520). For example, MEC device 117 may transmit a failover request that includes a request for the backup remote-controlling device to serve as the new active remote-controlling device for the teleoperations session with the remote-controlled device. MEC device 117 may also release the active remote-controlling device from performing the active remote-controlling functions in support of the teleoperations service.

In block 525, as a part of the failover procedure, MEC device 117 may perform the active remote-controlling device functions instead of the previous active remote-controlling device, as described herein.

In block 530, MEC device 117 may determine whether the failover procedure is complete, and continue to perform the active remote-controlling functions when the failover procedure is not complete (block 530-NO), and cease to perform the active remote-controlling functions (block 535) when the failover procedure is complete (block 530—YES). Thereafter, MEC device 117 may provide the edge computing-based teleoperations service with the previous backup remote-controlling device serving as the new active remote-controlling device.

Although FIG. 5 illustrates an exemplary embodiment of a process of the edge computing-based teleoperations service, according to other exemplary scenarios, the edge computing-based teleoperations service may perform additional operations, fewer operations, and/or different operations than those illustrated and described. For example, as a part of the failover procedure, MEC device 117 may select another backup remote-controlling device.

Figure 6:
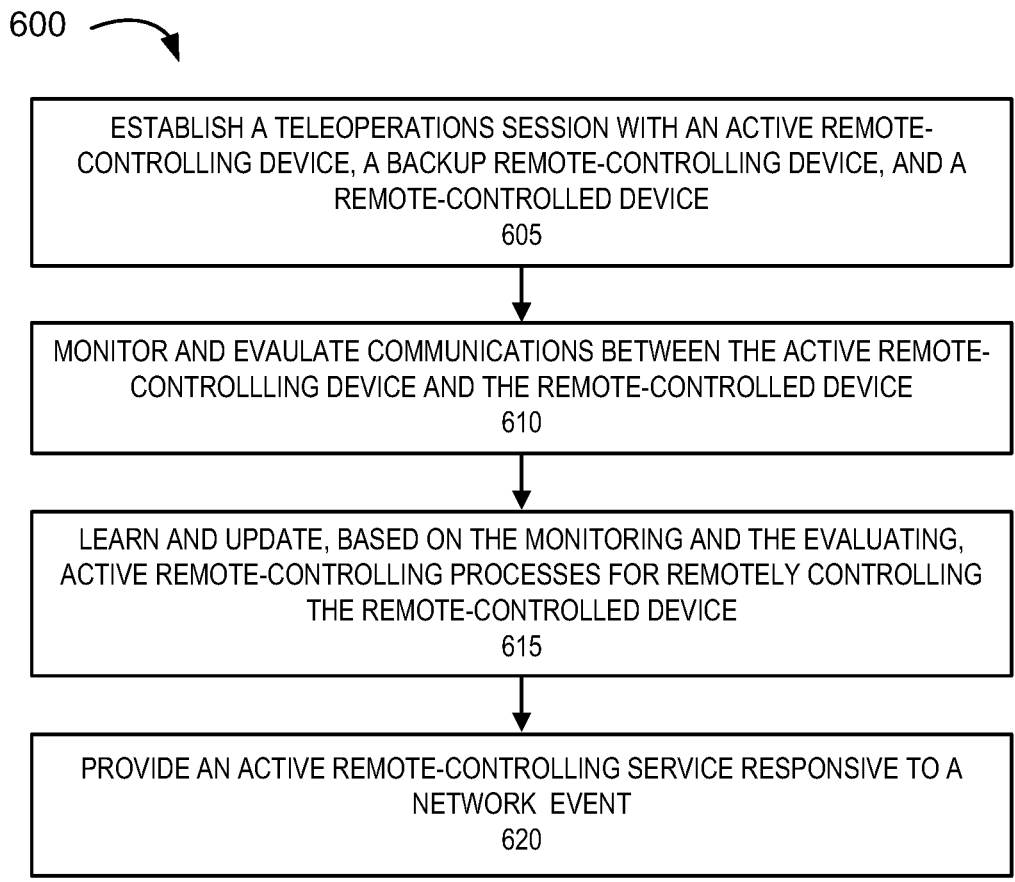
FIG. 6 is a flow diagram illustrating another exemplary process of an exemplary embodiment of the edge computing-based teleoperations service.

FIG. 6 is a flow diagram illustrating another exemplary process 600 of an exemplary embodiment of the edge computing-based teleoperations service. According to an exemplary embodiment, MEC device 117 may perform a step of process 600. According to an exemplary implementation, processor 410 executes software 420 to perform the step of process 600, as described herein. Alternatively, the step may be performed by execution of only hardware.

As illustrated in FIG. 6, block 605 of process 600 is similar to block 505 of process 500, which will not be repeated for the sake of brevity. In block 610, MEC device 117 may monitor and evaluate communications between the active remote-controlling device and the remote-controlled device. In block 615, MEC device 117 may learn continuously (e.g., by updating the learned model(s)), based on the monitoring and evaluating, active remote-controlling processes for remotely controlling the remote-controlled device, as described herein. In block 620, MEC device 117 may provide an active remote-controlling service responsive to a network event. For example, MEC device 117 may provide the active remote-controlling service during a failover procedure, a handover procedure, or other network event in which a current and active remote-controlling station is unable to provide such a service.

Although FIG. 6 illustrates an exemplary embodiment of another process of the edge computing-based teleoperations service, according to other exemplary scenarios, the edge computing-based teleoperations service may perform additional operations, fewer operations, and/or different operations than those illustrated and described. For example, MEC network 117 may be configured with a trained AI and/or ML component, and may update and/or further learn the active remote-controlling processes based on the monitoring and evaluation of communications received and in collaboration with the anchor service, as described herein.

Figure 7:
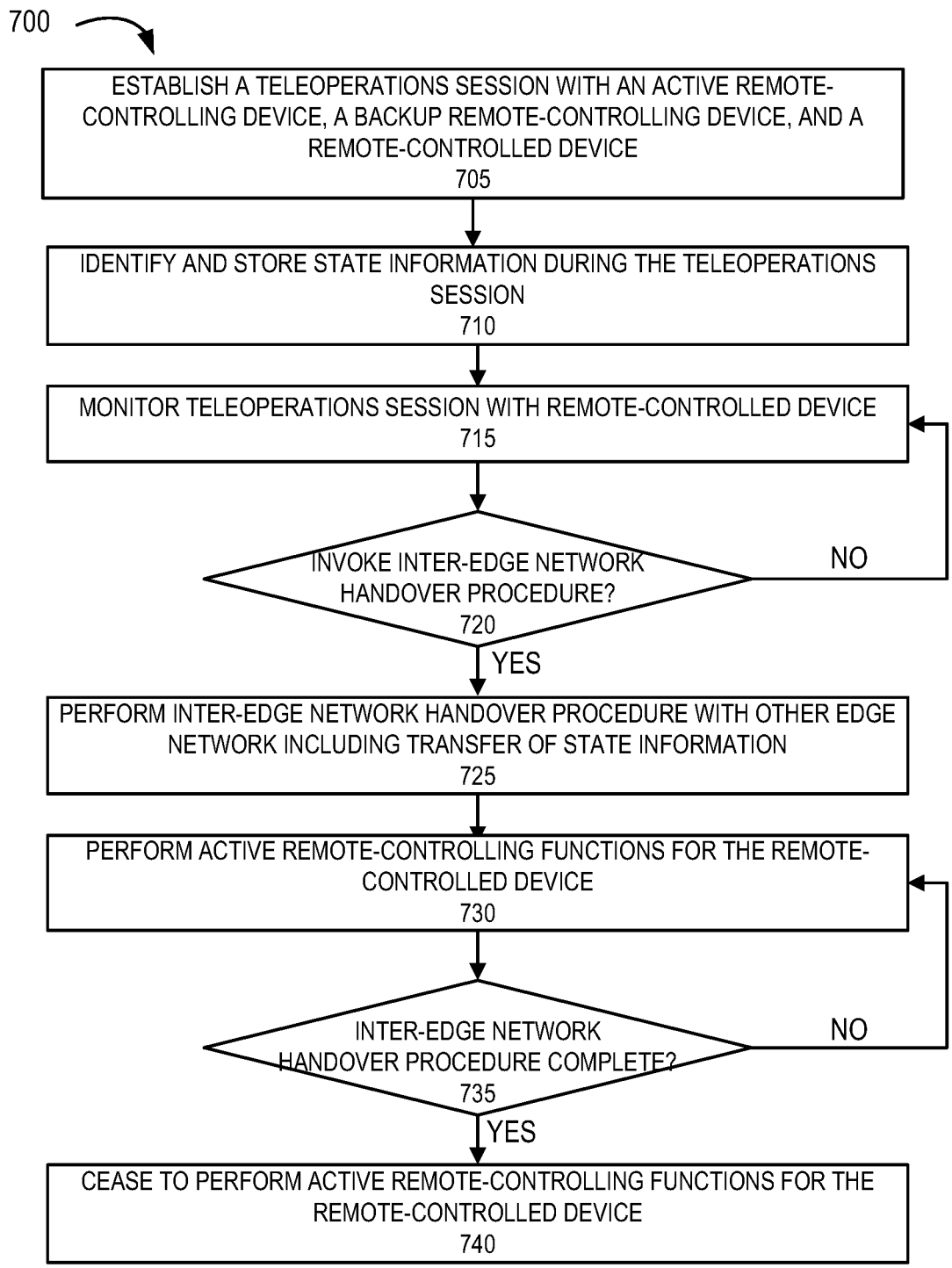
FIG. 7 is a flow diagram illustrating yet another exemplary process of an exemplary embodiment of the edge computing-based teleoperations service.

FIG. 7 is a flow diagram illustrating yet another exemplary process 700 of an exemplary embodiment of the edge computing-based teleoperations service. According to an exemplary embodiment, MEC device 117 may perform a step of process 700. According to an exemplary implementation, processor 410 executes software 420 to perform the step of process 700, as described herein. Alternatively, the step may be performed by execution of only hardware.

As illustrated in FIG. 7, block 705 of process 700 is similar to block 505 of process 500, which will not be repeated for the sake of brevity. In block 710, MEC device 117 may identify and store station information associated with the teleoperations session, as described herein. In block 715, MEC device 117 may monitor the teleoperations service with remote-controlled device. For example, MEC device 117 may receive mobility information from access device 107, and determine when a handover or anticipated handover between access devices 107 may occur. In block 720, MEC device 117 may determine whether an inter-edge network handover procedure is to be invoked based on the mobility information, as described herein.

When MEC device 117 determines that an inter-edge network handover procedure is not be invoked (block 720-NO), process 700 may return to block 715, and when MEC device 117 determines that an inter-edge network handover procedure is to be invoked (block 720—YES), MEC device 117/edge network may perform the inter-edge network handover procedure with another edge network including transfer of state information, as described herein (block 725).

In block 730, MEC device 117 may perform active remote-controlling functions for the remote-controlled device. Alternatively, the active remote-controlling station may continue to perform the active remote-controlling functions in support of the teleoperations service.

In block 735, MEC device 117/edge network may determine whether the inter-edge network handover procedure is completed. When it is not completed (block 735-NO), the active remote-controlling functions may continue to be performed by MEC device 117 (or the active remote-controlling station). When it is completed (block 735—YES), MEC device 117 (or the active remote-controlling station) may cease performing the active remote-controlling functions (block 740). The other MEC network/MEC device 117 may provide the edge computing-based teleoperations service for the remote-controlled device.

Although FIG. 7 illustrates an exemplary embodiment of another process of the edge computing-based teleoperations service, according to other exemplary scenarios, the edge computing-based teleoperations service may perform additional operations, fewer operations, and/or different operations than those illustrated and described.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5, 6, and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out"

processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    establishing, by a network device, a teleoperations session with an active remote-controlling device, a backup remote-controlling device, and a remote-controlled device, wherein the active remote-controlling device and the backup remote-controlling device are end devices operable by a user and enables the user to remotely control the remote-controlled device, wherein the backup remote-controlling device operates in a standby mode;
    invoking, by the network device, a failover procedure based on a connection state with the active remote-controlling device; and
    performing, by the network device during the failover procedure, active remote-controlling functions that include remotely controlling the remote-controlled device based on a learned model of the network device.

2. The method of claim 1, further comprising:
    requesting, by the network device during the failover procedure, that the backup remote-controlling device remotely control the remote-controlled device during the teleoperations session; and
    receiving, by the network device and from the backup remote-controlling device, an indication that the backup remote-controlling device will remotely control the remote-controlled device during the teleoperations session.

3. The method of claim 2, further comprising:
    ceasing to perform, by the network device in response to the receiving, the active remote-controlling functions.

4. The method of claim 1, further comprising:
    receiving, by the network device during the teleoperations session and prior to the performing, communications between the active remote-controlling device and the remote-controlled device;
    learning, by the network device, the active remote-controlling functions; and
    updating the learned model.

5. The method of claim 1, further comprising:
    releasing, by the network device, the active remote-controlling device from remotely controlling the remote-controlled device during the teleoperations session.

6. The method of claim 1, further comprising:
    storing, by the network device during the teleoperations session, state information relating to the teleoperations session.

7. The method of claim 1, wherein the establishing comprises:
    selecting, by the network device, the active remote-controlling device to remotely control the remote-controlled device during the teleoperations session; and
    selecting, by the network device, the backup remote-controlling device.

8. The method of claim 1, wherein the network device includes a multi-access edge computing (MEC) device of a MEC network.

9. A network device comprising:
    a processor configured to:
        establish a teleoperations session with an active remote-controlling device, a backup remote-controlling device, and a remote-controlled device, wherein the active remote-controlling device and the backup remote-controlling device are end devices operable by a user and enables the user to remotely control the remote-controlled device, wherein the backup remote-controlling device operates in a standby mode;
        invoke a failover procedure based on a connection state with the active remote-controlling device; and
        perform, during the failover procedure, active remote-controlling functions that include remotely controlling the remote-controlled device based on a learned model of the network device.

10. The network device of claim 9, wherein the processor is further configured to:
    request, during the failover procedure, that the backup remote-controlling device remotely control the remote-controlled device during the teleoperations session; and
    receive, from the backup remote-controlling device, an indication that the backup remote-controlling device will remotely control the remote-controlled device during the teleoperations session.

11. The network device of claim 10, wherein the processor is further configured to:
    cease to perform, in response to the receipt of the indication, the active remote-controlling functions.

12. The network device of claim 9, wherein the processor is further configured to:
    receive, during the teleoperations session and prior to the performance of the active remote-controlling functions, communications between the active remote-controlling device and the remote-controlled device;
    learn the active remote-controlling functions; and
    update the learned model.

13. The network device of claim 9, wherein the processor is further configured to:
    release the active remote-controlling device from remotely controlling the remote-controlled device during the teleoperations session.

14. The network device of claim 9, wherein the the processor is further configured to:
    store, during the teleoperations session, state information relating to the teleoperations session.

15. The network device of claim 9, wherein, when establishing, the processor is further configured to:
    select the active remote-controlling device to remotely control the remote-controlled device during the teleoperations session; and
    select the backup remote-controlling device.

16. The network device of claim 9, wherein the network device includes a multi-access edge computing (MEC) device of a MEC network.

17. A non-transitory computer-readable storage medium storing instructions executable by a processor of a network device, which when executed cause the network device to:
    establish a teleoperations session with an active remote-controlling device, a backup remote-controlling device, and a remote-controlled device, wherein the active remote-controlling device and the backup remote-controlling device are end devices operable by a user and enables the user to remotely control the remote-controlled device, wherein the backup remote-controlling device operates in a standby mode;

invoke a failover procedure based on a connection state with the active remote-controlling device; and perform, during the failover procedure, active remote-controlling functions that include remotely controlling the remote-controlled device based on a learned model of the network device.

18. The non-transitory computer-readable storage medium of claim 17, wherein the instructions further comprise instructions, which when executed cause the network device to:

request, during the failover procedure, that the backup remote-controlling device remotely control the remote-controlled device during with the teleoperations session; and receive, from the backup remote-controlling device, an indication that the backup remote-controlling device will remotely control the remote-controlled device during the teleoperations session.

19. The non-transitory computer-readable storage medium of claim 18, wherein the instructions further comprise instructions, which when executed cause the network device to:

cease to perform, in response to the receipt of the indication, the active remote-controlling functions.

20. The non-transitory computer-readable storage medium of claim 17, wherein the instructions further comprise instructions, which when executed cause the network device to:

receive, during the teleoperations session and prior to the performance of the remote-controlling functions, communications between the active remote-controlling device and the remote-controlled device;

learn the active remote-controlling functions; and update the learned model.

* * * * *